(12) United States Patent
Roos et al.

(10) Patent No.: US 8,385,535 B2
(45) Date of Patent: Feb. 26, 2013

(54) METHOD AND SYSTEM FOR REMOTELY AUTOMATING CROSS-CONNECTS IN TELECOM NETWORKS

(76) Inventors: Sture Roos, Mongagua (BR); Johan Öberg, legal representative, Stockholm (SE); Jan Ulander, Djursholm (SE)

( * ) Notice: Subject to any disclaimer, the term of this patent is extended or adjusted under 35 U.S.C. 154(b) by 1382 days.

(21) Appl. No.: 10/596,385

(22) PCT Filed: Dec. 10, 2004

(86) PCT No.: PCT/IB2004/052762
§ 371 (c)(1),
(2), (4) Date: Sep. 11, 2007

(87) PCT Pub. No.: WO2005/057948
PCT Pub. Date: Jun. 23, 2005

(65) Prior Publication Data
US 2008/0247319 A1 Oct. 9, 2008

(30) Foreign Application Priority Data

Dec. 11, 2003 (SE) .................................... 0303332

(51) Int. Cl.
*H04M 3/00* (2006.01)
*H04M 5/00* (2006.01)
(52) U.S. Cl. ..................... 379/327; 379/325; 379/335
(58) Field of Classification Search .......... 379/325–327, 379/333–335
See application file for complete search history.

(56) References Cited

U.S. PATENT DOCUMENTS

| 4,807,280 A | * | 2/1989 | Posner et al. ................. 379/272 |
| 4,817,134 A | | 3/1989 | Pickens et al. |
| 4,833,708 A | | 5/1989 | Goodrich |
| 6,265,842 B1 | | 7/2001 | Hard et al. |
| 6,597,784 B1 | | 7/2003 | Kakihara et al. |

\* cited by examiner

*Primary Examiner* — Rasha Al Aubaidi
(74) *Attorney, Agent, or Firm* — Schwegman Lundberg & Woessner, P.A.

(57) ABSTRACT

A method and system for automating cross-connects for a telecommunication system comprising a network of communication lines for connecting subscriber locations to a central office exchange 112. The communication lines extend to the subscriber locations from a main distribution frame (MDF) (320) in which a plurality of standard termination blocks are housed in the MDF for terminating the lines from to the subscriber side and lines from the exchange side, which are cross-connected in the prior art with jumper wires. In an embodiment of the invention, the cross-connects are mounted on modular cross-connect boards having mechanical switching means that are inserted into or connected to the termination blocks. Automation is achieved by selectively controlling the connection state of the cross-connects via a computer terminal (350,352) located remotely from the MDF. The system is scalable to the growth in subscriber lines within the MDF by installing additional cross-connect boards. A further embodiment includes automation of street cabinets (328) and drop point sites (330) containing cross-connect boards of the present invention.

21 Claims, 13 Drawing Sheets

METHOD AND SYSTEM FOR REMOTELY AUTOMATING CROSS-CONNECTS IN TELECOM NETWORKS

The present invention pertains generally to telecommunication networks and infrastructure, and more particularly to a method and system for remotely automating cross-connects in main distribution frames, street cabinets and drop point sites.

BACKGROUND OF THE INVENTION

FIG. 1 shows a typical modern telecommunication network that comprises a very high capacity back-bone optical fiber ring 100 that typically runs nearby the largest cities 102 that forms a part of the national core network. Connected to the national core network are metropolitan fiber rings 104 that surround the cities at several levels and connects to a local central office (CO) 110. The central office 110 houses switching equipment or a telephone exchange 112 and is the point to which subscriber home and business lines 120 are connected to the network on what is called a local loop. Many of these connections to residential subscribers are typically made using a pair of copper wires, also referred to as a twisted pair, that collectively form a large copper network operated by the telecom provider. Within the CO 110 the line connections between the exchange side and the subscriber side are terminated at a main distribution frame (MDF) 114, which is usually the point where cross-connections between the subscriber lines and the exchange lines are made. In addition, similar cross-connections may be located in sites closer to the serviced areas such as a local residential area, that are known as drop points and cross-connect cabinets. Furthermore, MDF 114 usually holds central office protective devices and functions as a convenient test point between the subscriber lines and the Office.

Virtually every aspect of the telecommunication network is automated with the notable exception of the copper network. Management of the copper infrastructure is a highly labour intensive process that results in one of the most significant costs faced by telecommunication providers today. By way of example, when a new subscriber requests a service such as a new phone line, technicians are dispatched to a CO 110 to manually add jumpers to the main distribution frame to activate the line. The same level of labour is required when a service is to be removed or modified. This manual process is naturally prone to errors since the technician can inadvertently make incorrect cross-connects that can delay activation of new services, or cause a temporary loss of existing services. Over time as these wires can accumulate to become such a mishmash to the point where a complete rewiring is required. This would impact current services and could result in increased customer dissatisfaction and leads to unnecessary operational expenditures in expensive labour costs.

FIG. 2 shows an exemplary central office MDF cabinet that comprises columns of line termination blocks or connector blocks where the lines from the exchange 112 terminate (or connect) in the MDF at the exchange side termination blocks 210. A column of termination blocks 220 are located on the line side of the MDF coming from the subscriber lines. The cross-connects are made by physically placing a jumper wire 230 to connect the appropriate line from the line side to the exchange side. In practice there may be several columns or stages of termination blocks on either side of the MDF whereby all line pairs may conceivably be connected with a jumper lines that bridge the line and Exchange blocks thereby leaving behind a disorganized jumble of wires that is often difficult to manage.

Another issue with the current manual intensive process is that technicians must often go to the distribution frame to manually analyse or test lines in the copper network. For example, during service initiation a technician must manually connect test equipment to verify the accuracy of the circuit installation. In some instances, verifying and testing connections becomes significantly more difficult if over the years improper connections were made that were not correctly logged. Troubleshooting then becomes inordinately tedious, time consuming and expensive. For telecommunication providers holding down costs has become a significant priority, especially in today's competitive deregulated environment.

It has long been desired by service providers to reduce the amount of labour required to maintain and manage their copper infrastructure. An area that has held much interest is to automate many of the manual tasks currently associated with MDFs such as making/breaking cross-connections for service initiation/removal and network management and testing. In this vein there have been attempts in the past to automate MDFs using various technologies, each suffering from limitations that have rendered them uncompetitive and thus have not been deployed on a wide scale.

One technology that was investigated is an electromechanical solution using metallic relays as a means to automate cross-connects in MDFs. Although the use of electromechanical relays have been used in conventional telecommunications equipment for many years and have proven reliable for use in e.g. voice switches, the limited switching capacity of matrix boards constructed with relays has been a problem. In practice it is difficult to construct large switches with relays because the size of the individual relays are relatively large. This is mainly due to the relatively high voltage levels used that limit the level of miniaturization for mechanical devices. Thus a MDF servicing a fair size CO may require millions of relays for suitable connectivity, would be expensive to maintain, and occupy far too much space to be economical. Consequently, MDFs based on this technology never really got implemented for large-scale applications.

Another area of previous interest is automation by use of robotic solutions. Robotic technology is used to physically remove and insert pins in holes within a matrix board to make the various cross-connects. Automatic pin inserting/removing robots operate by using a pick-and-place mechanism to automatically insert pins at the desired hole locations in the matrix board in order to selectively connect subscriber input line pairs to multiple CO lines. Although the robot mechanism can be extremely accurate to within tenths of millimetres, the mechanism head requires movement along three axes necessitating a drive motor structure that is relatively complex. Furthermore, the mechanical components are subject to reliability and maintenance issues due to the numerous moving parts. Service providers take these issues very seriously since costs can quickly escalate if the equipment constantly needs to be attended to. In large size COs or those experiencing significant growth, reliability issues become even a greater concern and therefore the technology had never become viable for deployment on a large scale.

Another major disadvantage of the prior art solutions is their lack of flexibility to easily scale the size of deployment, since various telephone exchanges and central offices often vary widely in size. For example, central offices outside of major population centres such as those servicing rural areas, may experience relatively slow growth and are somewhat stable in terms of new connections. On the other hand, central offices in densely populated urban areas may experience tremendous growth in orders for services such as xDSL and the like which tend to expand at high rates. Deployed MDFs must be able to operate economically and be able to cope with conditions of high growth. The solutions of the prior art fail to provide adequate provisions for dealing with high growth since e.g. the size of the matrix board that a robot can traverse is generally fixed and is difficult to enlarge without completely replacing the equipment. Such growth requires significant capital expenditures and substantially increases the complexity to the network infrastructure.

While automated cross-connecting technologies have existed for some time, none of the prior art solutions have been able to fulfil requirements for cost-effectiveness and scalability as required by telecom service providers.

SUMMARY OF THE INVENTION

It is a principal object of the present invention to overcome the disadvantages of the prior art to provide a solution that enables telecom service providers to eliminate many of the manual tasks associated with network management of their copper infrastructure.

Further to that respect, it is desirable to provide a method and system for remotely automating cross-connects in a telecommunication system to substantially reduce costs by eliminating the need for dispatching technicians onsite to manually add, remove, or modify cross-connects for subscriber communication lines.

It is another object of the present invention to eliminate the requirement for onsite visits by technicians for tasks such as service provisioning, fault detection and isolation, and circuit monitoring.

A further object of the present invention is to provide improved operational efficiency by increasing service response times and eliminating human errors in making, removing, or modifying cross-connects.

A still further object of the present invention is to provide means for automatically obtaining an accurate database of the current cross-connect status in the MDF and central office.

Another object of the present invention is to provide a solution that can be installed in a non-intrusive manner such that existing services connections are not disrupted.

Yet another object of the present invention is to provide a cost-effective solution that fulfils the scalability requirements required by telecom service operators.

Briefly described and in accordance with embodiments and related features of the invention, there is provided a method and system for automating cross-connects for a telecommunication system comprising a network of communication lines for connecting subscriber locations to the central office exchange. The communication lines extend to the subscriber locations from a main distribution frame (MDF) in which a plurality of standard termination blocks are housed within the MDF for terminating the lines from to the subscriber side and lines from the exchange side, which are cross-connected in the prior art using jumper wires. In a first embodiment of the invention, the cross-connects are mounted on modular cross-connect boards having motor driven mechanical switching means that are inserted into the termination blocks. Automation is achieved by selectively controlling the connection state of the cross-connects via a remote computer terminal at distant location from the central office. The system is scalable to the growth in subscriber lines within the MDF by installing additional cross-connection boards as necessary to meet the need.

In accordance with a second embodiment of the invention, automation is provided for an extended network of street cabinets 328 and drop point sites which contain the cross-connect boards of the present invention.

In accordance with a method aspect of the invention, the process of activating a subscriber communication line includes entering information related to the work order into a remote computer terminal by an operator. The software operated by the remote computer terminal determines the appropriate central office and MDF for the connection. The following step includes checking the current allocated resources relating to the MDF from a predetermined database. Based in part on the current resource allocation, the software selects an available communication line for connection to the exchange. Commands are transmitted from the remote computer terminal to the MDF to locate the specific cross-connect board and selectively activate the appropriate cross-connect to connect the subscriber line.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

Figure 1:
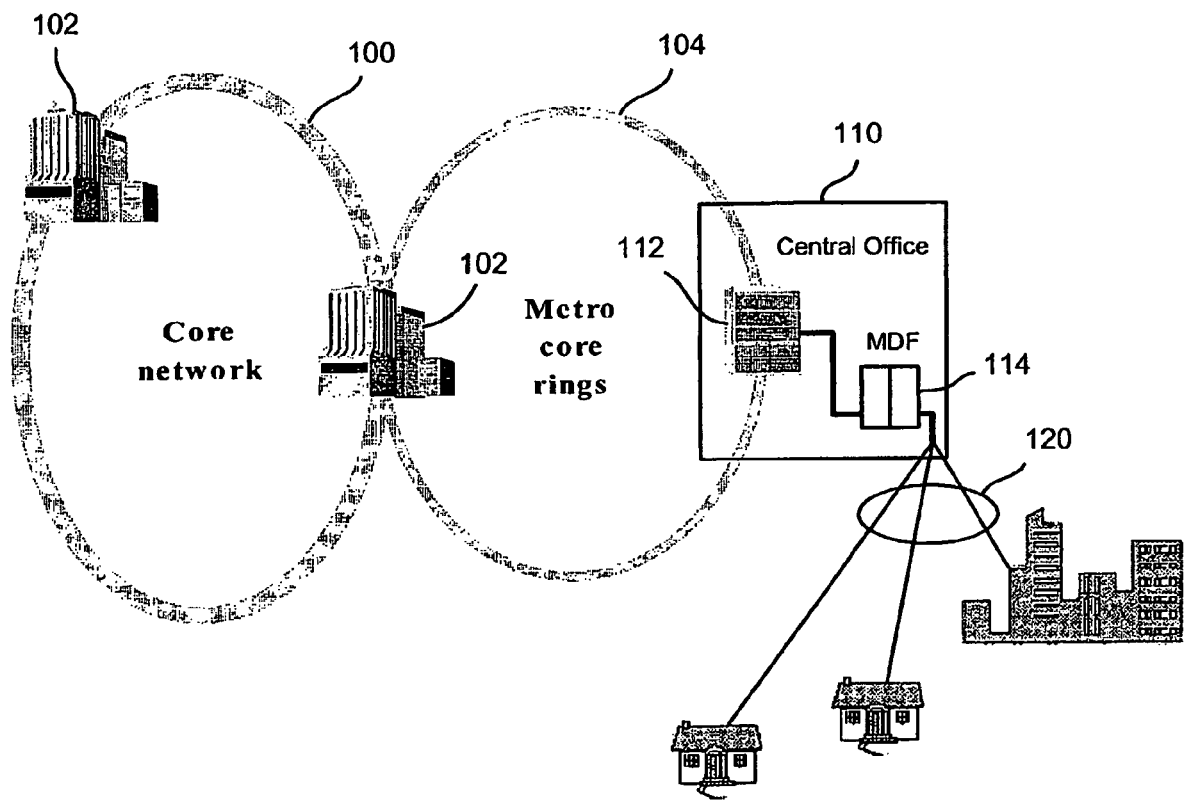
FIG. 1 is a depiction of a modern telecommunication system.
Figure 2:
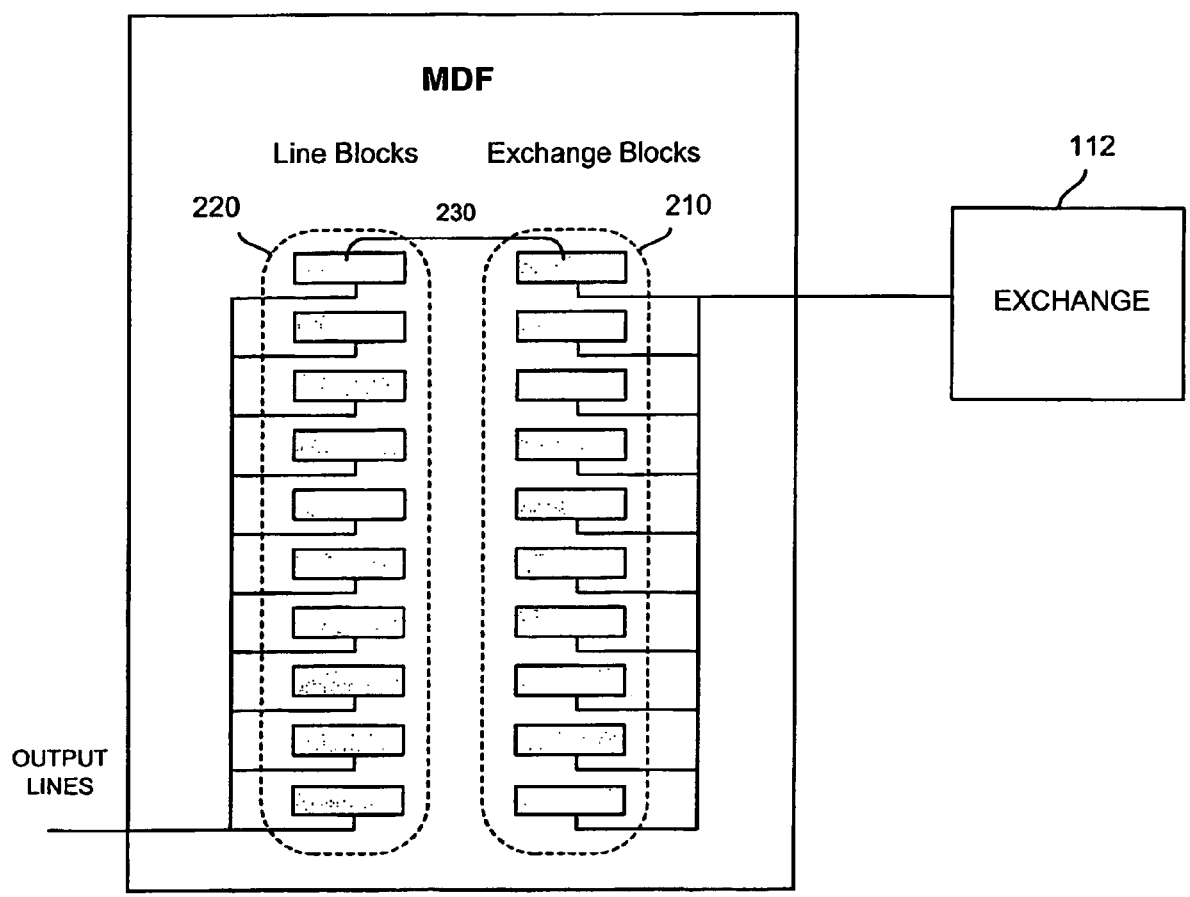
FIG. 2 an exemplary central office MDF cabinet of the prior art cross-connected with jumper wires.
Figure 3:
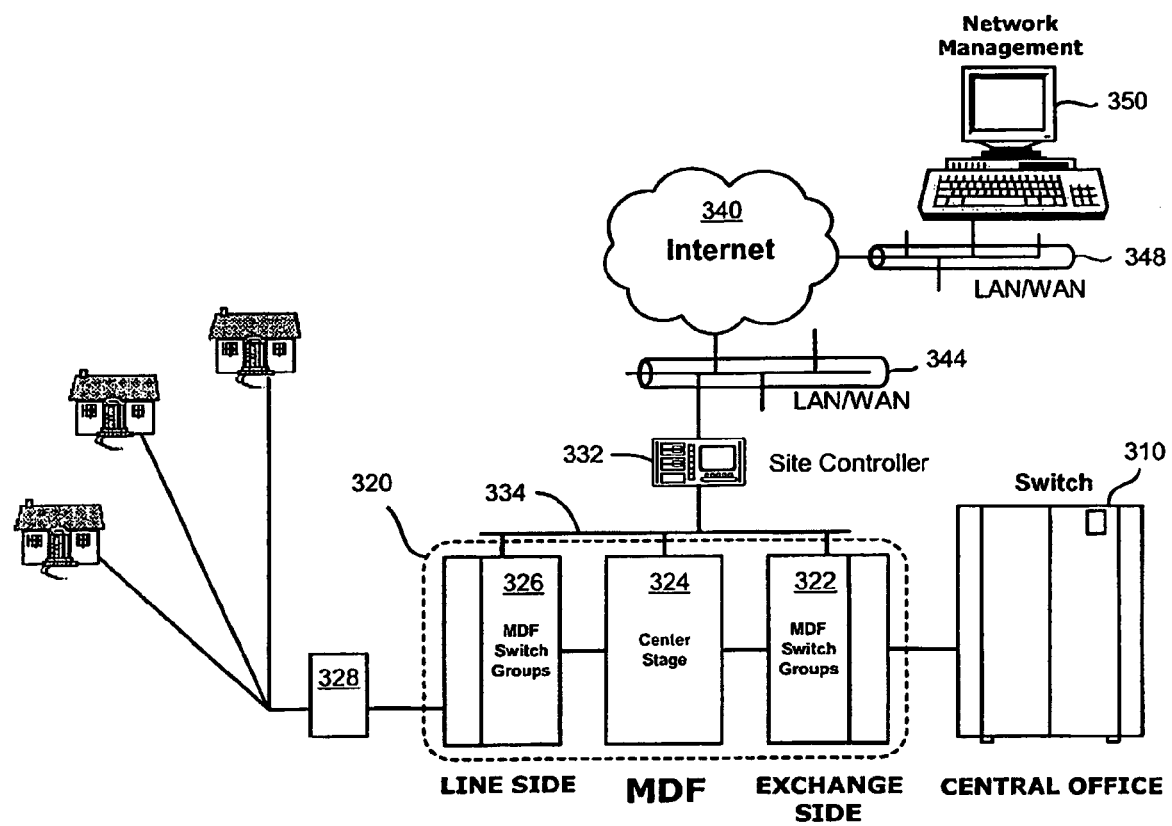
FIG. 3 illustrates a remotely controlled automated cross-connect system operating in accordance with a first embodiment of the invention.

FIG. 3 illustrates an automated cross-connect system that can be controlled from a remote location 350 operating in accordance with a first embodiment of the invention. The automated cross-connect system is a central office application that is largely concentrated with automating the cross-connections between the exchange side and the line side within the main distribution frame (MDF) 320. MDF 320 comprises a center stage 324 of cross-connect boards interconnected between the standard the exchange side MDF switch groups on the exchange side 322 and on the line side 326. The exchange side line pairs are connected to the ports at the central office switch 310, where at one end are terminated in blocks on the exchange side switch groups 322. Similarly, the output lines on the line side are terminated in blocks in the line side switch groups 326, which in the simplified layout feeds out to a street cabinet 328 typically located in the vicinity of the subscribers. In terms of capacity, these street cabinets typically handle 100-1000 line pairs whereas a typical MDF generally may handle between 1000-100 K line pairs or more.

In place of the jumble of physical jumper cables in the prior art used to make cross-connections is an automated cross-connect center stage 324 that comprises a collection of rack mounted cross-connect boards. It should be noted that the invention is not limited to the mere automation of the MDF but the invention is applicable to remotely controlling the cross-connects in street cabinets or drop points sites as well.

The automated system equipment of the present invention can be installed into standard MDF in a non-intrusive manner i.e. there is no disruption of the existing connections while installing the equipment. The equipment is capable of being installed seamlessly into almost all current MDFs using standardized termination blocks. The ability to install non-intrusively eliminates the need for loading existing cross-connection information from a database that may have discrepancies from the actual physical connections. And most importantly, it allows for no disruptions in the subscriber's service during installation. The basic structure of the wireline networks is basically the same worldwide, however, there are minor differences in the termination blocks or plints used in the MDFs. Several variations of plints are in use with the most common being the LSA-Plus termination block manufactured by KRONE Inc., a subsidiary of GenTek Inc. of Hampton, N.H., USA.

Figure 4:
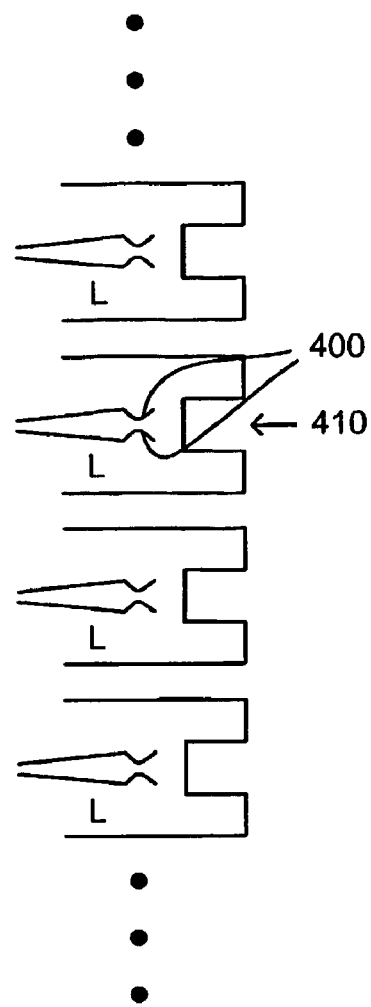
FIG. 4 shows side view illustration of an exemplary set of termination blocks used in the MDF.

FIG. 4 shows side view illustration of exemplary set of termination blocks used for the line side in the MDF. In a typical existing MDF configuration there are similar corresponding sets of blocks for the exchange side lines. Each termination block terminates 10 wire line pairs that may be cross-connected to corresponding line pairs on the exchange or equipment side termination blocks. For the sake of simplicity, only the line side termination blocks are shown. At the end of the termination block are contact clips 400 into which jumper wires are inserted and slots 410 into which test equipment can be inserted by technicians to test line connections, for example. In accordance with the embodiment of the invention, cross-connection boards are inserted in the termination blocks that contain motor driven mechanical switch elements that provide the cross-connects. During installation the cross-connect boards are inserted into both the line side and exchange side termination blocks without disrupting existing voice or xDSL connections.

Installation of Cross-Connect Boards

Figure 5:
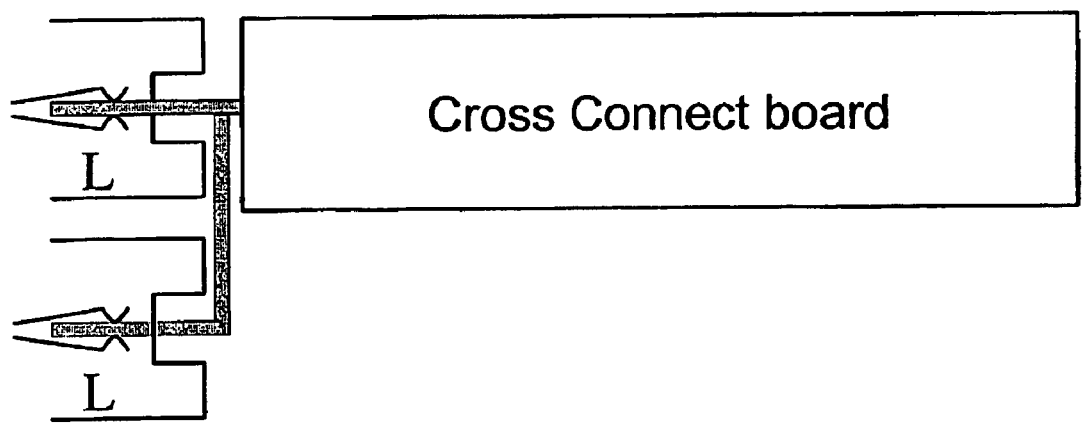
FIG. 5 depicts an exemplary cross-connect board installed in a line side termination block in accordance with the invention.

FIG. 5 depicts an exemplary cross-connect board installed in a line side termination block in accordance with the invention. This type of installation is often used for installing the equipment in MDFs containing existing line connections in a non-disruptive manner. The cross-connect board is inserted into two adjacent line to line (L to L) termination blocks resulting in half of the number of installed boards to the number of blocks.

Figure 6:
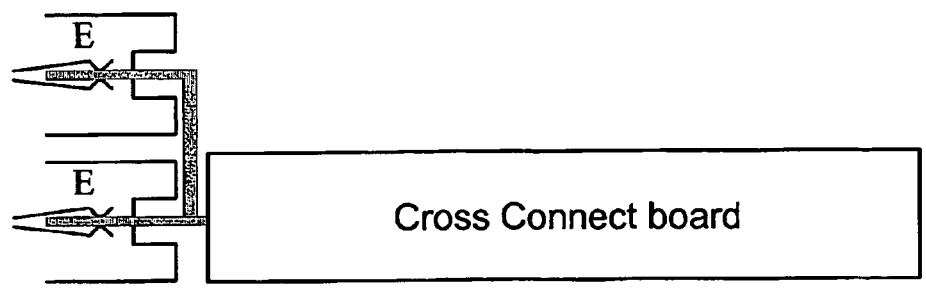
FIG. 6 shows the cross-connect board inserted into a block on the exchange side.

FIG. 6 shows a corresponding cross-connect board to that in FIG. 5 inserted into a block on the exchange side blocks. The cross-connection boards include a plurality of cross-connect switches on each board, for example, 10×10 cross-connects on each board for a total of 20×20 combined on two boards connected to the respective MDF termination blocks (line and equipment side blocks). It should be noted that the number of cross-connects included on the boards given herein are for illustrative purposes, and that higher (or lower) numbers of cross-connects on the boards are suitable for use with the invention. By way of illustration, the 10 line pairs per board described above can be used in the case of LSA-PLUS configuration. Those skilled in the art will appreciate that it is possible to connect more cross-connect boards in series and the example of two boards described is exemplary. A common arrangement in most MDFs includes columns of 100 termination blocks for either the line or exchange side, it is possible to use a series connection of five cross-connect boards at a time. This configuration can be used in very large capacity MDFs handling cross-connections for 160 K input line pairs to 160 K output lines pairs using a 7 level switch with a 5 level center stage, for example.

There is an inherent flexibility in the installation process in that the board configuration can be tailored to the size of the MDF i.e. in a high capacity MDF requiring cross-connections for a large number of line pairs (e.g. up to 4 million) can be can be readily accommodated by situating the necessary additional boards in a center stage 324 within the MDF. It should be noted that the cross-connection boards of the present invention might be connected to the termination blocks of other manufacturers in ways other than by inserting them into slots.

Figure 7:
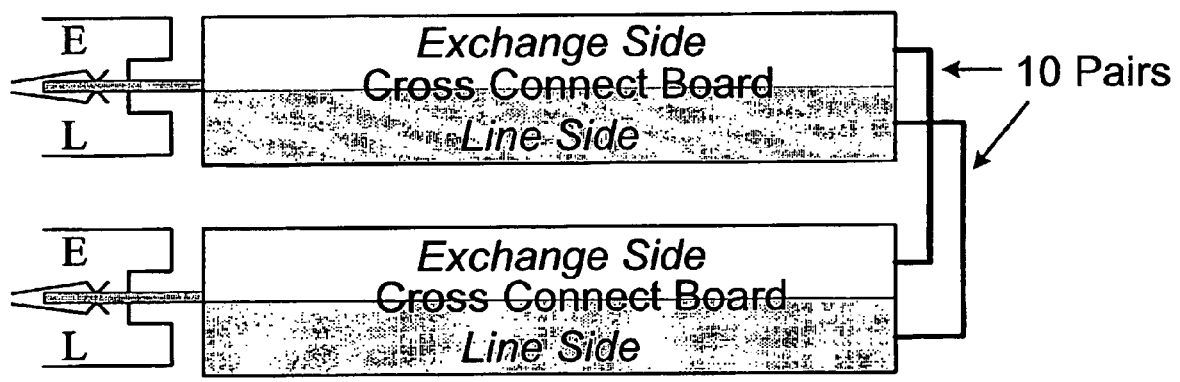
FIG. 7 shows a new installation of a first type for installing cross-connect boards into termination blocks having both line and exchange side contacts on the same block.

On a new MDF installation or when adding lines to an existing MDF, alternative configurations exist for installing the cross-connect boards into the termination blocks. FIG. 7 shows a new installation of a first type for installing cross-connect boards into termination blocks having both line and exchange side contacts on the same block. In this arrangement, the cross-connect boards are installed in pairs whereby each board contains a total of 20 pairs of line connections i.e. 10 pairs for the exchange side and 10 pairs for the line side in the case of LSA-PLUS, for example. This configuration reduces the number of cross-connection boards by half compared to that in FIG. 6.

Figure 8:
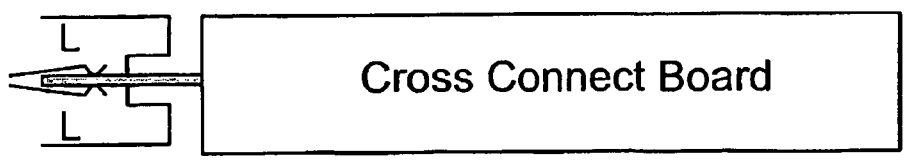
FIG. 8 shows a new installation of a second type for installing a cross-connect board into a termination block containing line connections on both contacts in the same block.

FIG. 8 shows a new installation of a second type for installing a cross-connect board into a termination block containing line connections on both contacts in the same block. This optional configuration also enables one to use fewer number of relatively expensive termination blocks. It should be noted that the cross-connection boards of the present invention can work with different variants of termination blocks, requiring only slight modifications to the invention with relatively minor conversion costs.

Center Stage

Figure 9:
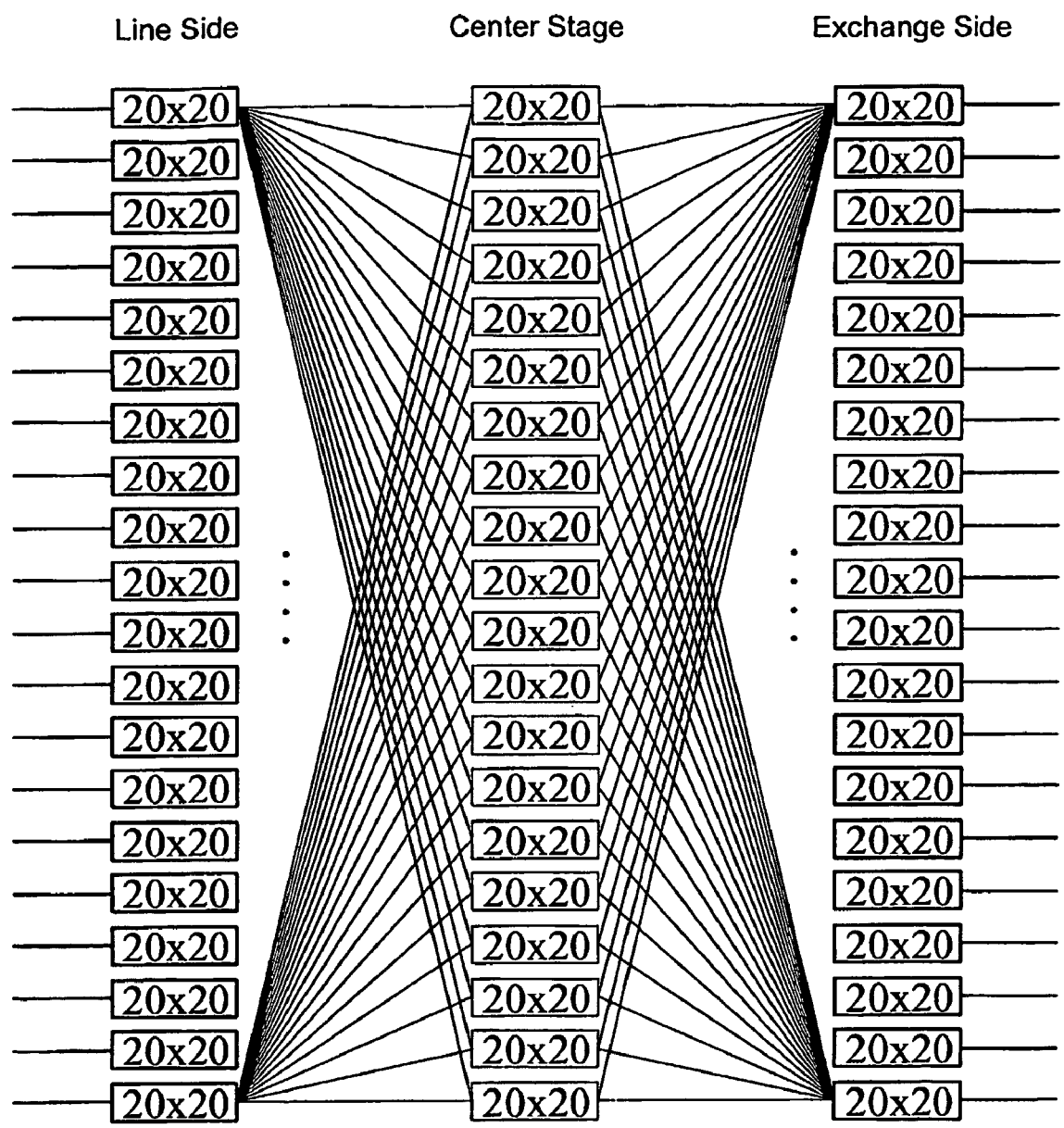
FIG. 9 is a simplified diagram showing the interconnections between the cross-connection boards of the line side, center stage, and exchange side.
Figure 10:
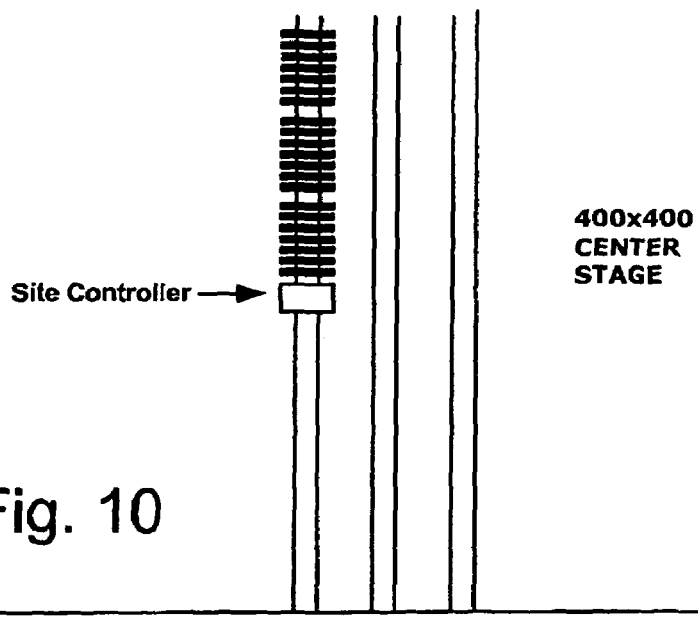
FIGS. 10 and 11 illustrate the rack mounted center stages installed within the MDF.
Figure 11:
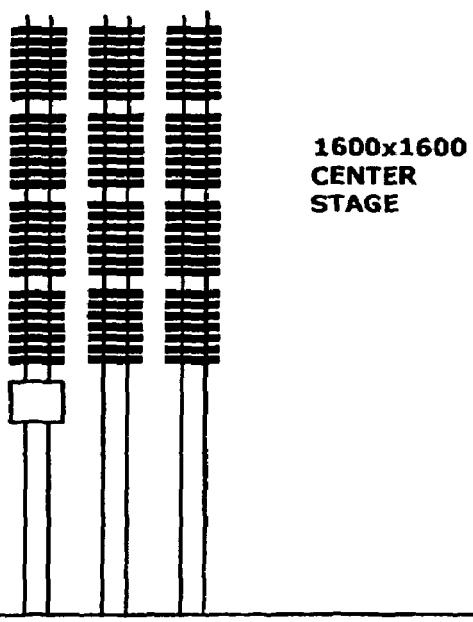

Referring now to FIG. 9, an exemplary simplified diagram is shown of the interconnections between the cross-connection boards of the line side, center stage, and exchange side. In this example, each line side 20×20 cross-connection board is connected to each 20×20 board of the center stage which in turn is connected to every 20×20 board on the exchange side. It will be appreciated by those skilled in the art that the interconnection between the boards and the center stage is of primary importance and that the specific 20×20 board configuration is exemplary in that other board configurations are possible. FIGS. 10 and 11 illustrate the rack mounted center stages of 400×400 and 1600×1600 line pairs for installation within the MDF. It will be appreciated by those skilled in the art that the size (or number of levels) of the center stage will depend on the number of line pairs connected upon installation. For example, for large capacity MDFs connection to center stages of 1600×1600, 4000×4000 line pairs or greater are possible. However, the capacity of the center stage can be less than the number of lines pairs handled by the MDF since only the cross-connects altered after installation require center stage cross-connections. This is because the non-intrusive aspect of the system i.e. all pre-existing cross-connects made by jumper wires are maintained and thereby are not affected by the system.

A site controller is mounted on the rack that supervises the cross-connection boards and directs the routing to the individual cross-connects. The site controller also logs the connection state of all cross-connects on the boards. The cross-connect boards used in the invention provide easy scalability in that more boards can be added to the center stage as the number of subscriber lines grow within the MDF. The center stages are able to be housed within a standard MDF cabinet without modification.

Cross-Connect Board

Figure 12:
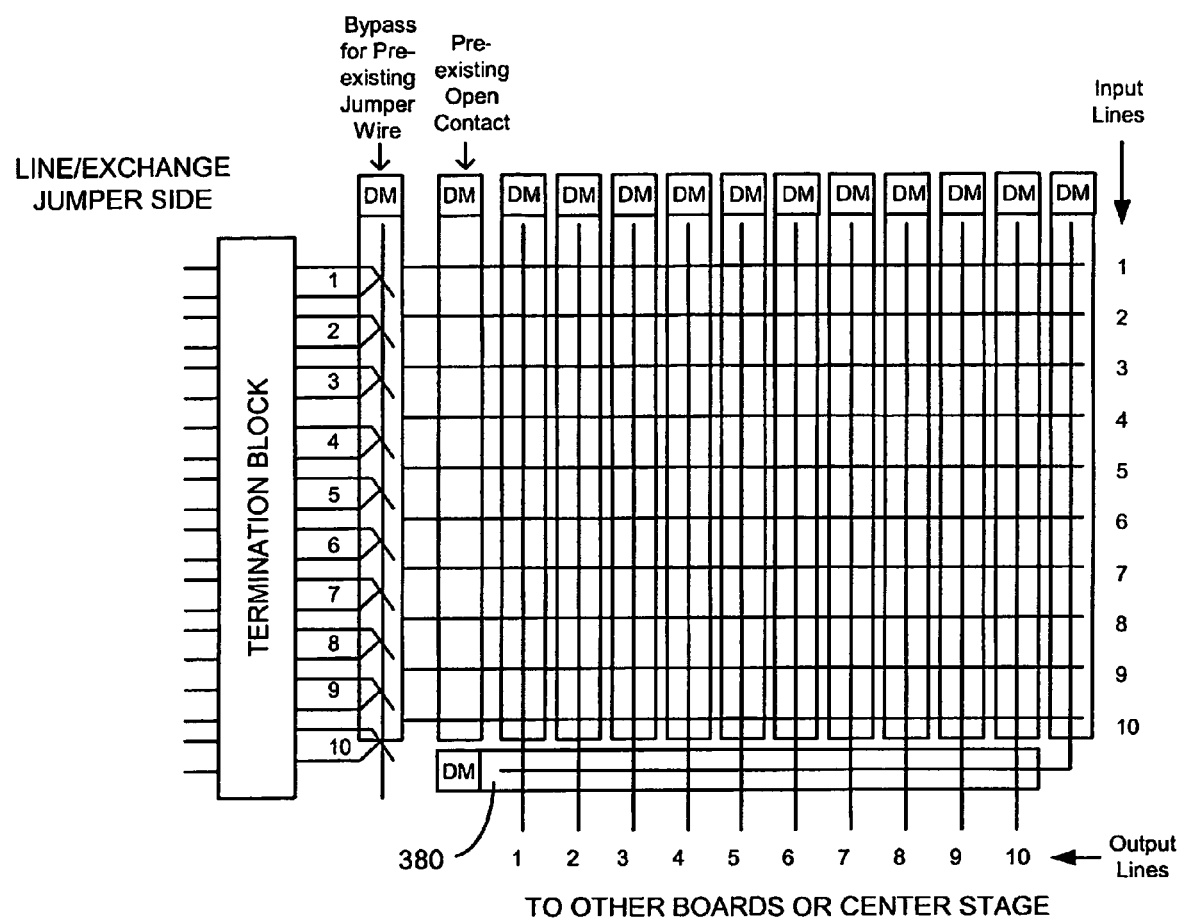
FIG. 12 is a diagrammatic illustration of a cross-connect board used in the invention.

Referring now to FIG. 12, there is shown a diagrammatic illustration of an exemplary cross-connect board used for cross-connecting 10 line pairs in accordance with the present invention. The cross-connect board is inserted into the line side or the exchange side termination blocks in which each board has the capacity to locally switch 10 line pairs. The line switching is arranged to occur in the manner of a matrix in which any input line 1-10, e.g. from the exchange side, can be cross-connected to any output line 1-10 to the subscriber (for a 10×10 board). It should be noted that the cross-connect board is not limited to a switching matrix between pairs of lines but that it is possible to configure cross-connections between any individual contact point.

The system of the present invention has the advantageous feature of being non-intrusive during installation i.e. pre-existing line connections that were made by jumper wires are not affected when the cross-connect boards are plugged into the termination blocks. This is achieved by including two additional cross-connects on the switch matrix, in addition to the 10 line cross-connects. The first is a bypass component or cross-connect for each line that is preset prior to installation to act as a 'short circuit' between the contacts when a pre-existing jumper wire is connected between termination blocks. This allows the line to bypass the switch matrix if, upon installation of the cross-connect board, there is a pre-existing cross-connect made by jumper wire. The bypass permits a jumper wire connection to continue even though the connection is broken when the board is inserted into the block, which separates the contact clips. The second is a reset state or reset position that preserves the condition when no jumper wire present for the line pair and is driven by drive means DM shown conceptually. The reset position is also used when a line pair is disconnected or the cross-connect is removed. Subsequently when a cross-connect is to be made for the line pair, the appropriate cross-connect is moved into the position by drive means DM to connect the input line pair to the desired output line pair 1-10.

Figure 13:
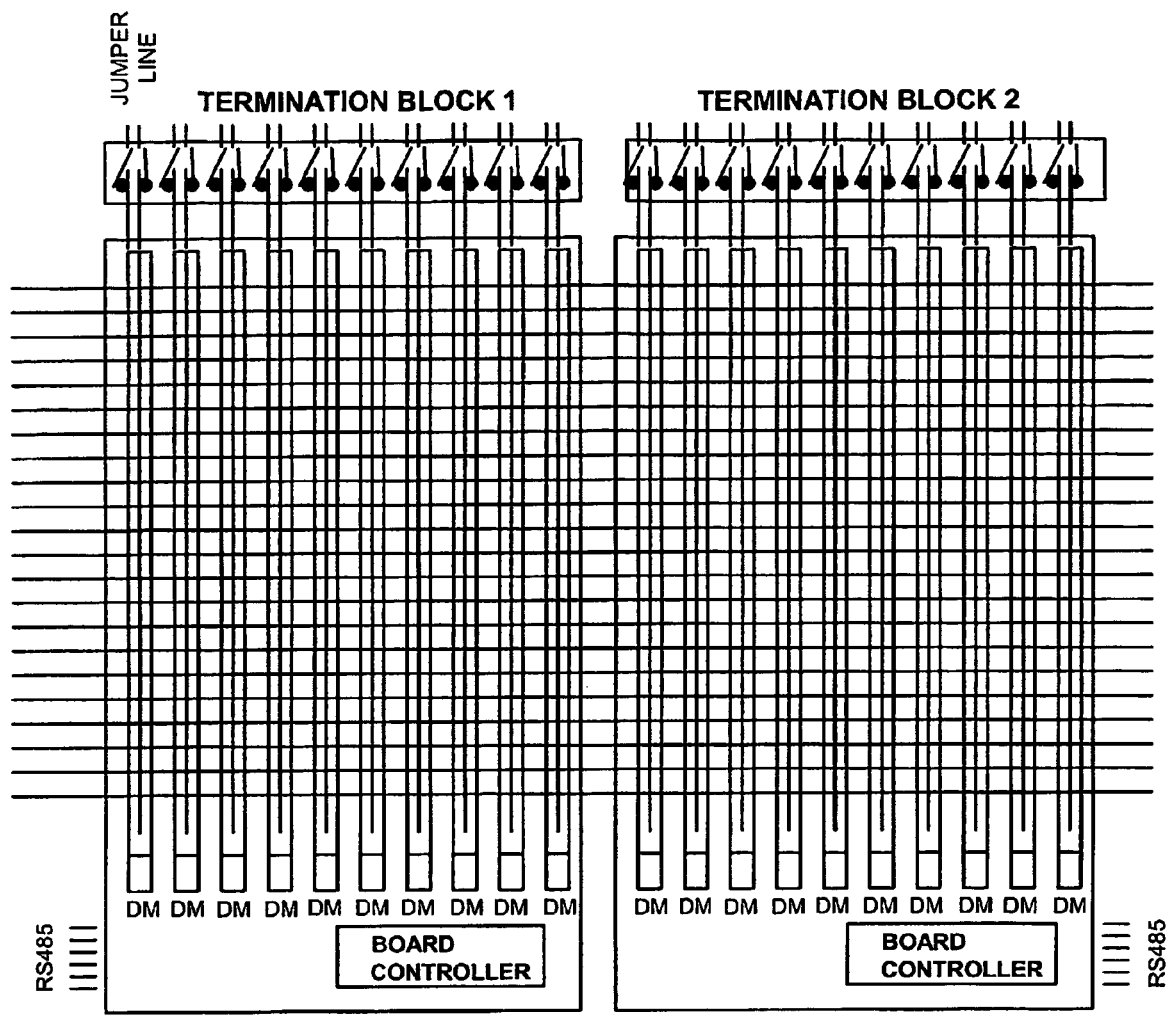
FIG. 13 is a diagrammatic layout of a unit comprising two cross-connect boards inserted into respective blocks for cross-connecting an exemplary 20 line pairs.

FIG. 13 shows a diagrammatic layout of a unit comprising two cross-connect boards inserted into two blocks for cross-connecting 20 line pairs, for example. The unit comprises two interlinked cross-connect boards each are inserted into two separate termination blocks in the MDF. Both cross-connect boards can cross each cross-connect 10 pairs for a total capacity for cross-connecting 20×20 pairs. The individual cross-connects are controlled by a board controller via a communication link 334, for example, a standard RS485 bus and interface circuit. The RS485 communication link uses a twisted pair line for each signal typically using differential transmitters with alternating voltages between 0V and 5V. It should be noted that the invention is not limited to the use of RS485 but other suitable communication links can be employed. However, RS485 has proven to be an economical solution since it is a relatively low cost and well-defined communication link having commonly available circuits that operate at 2.5 MB/s transfer rates for cables that can extend as far as 1200 meters. The RS485 communication link is used to connect the board controllers within the site controller 332 in the MDF.

Figure 14:
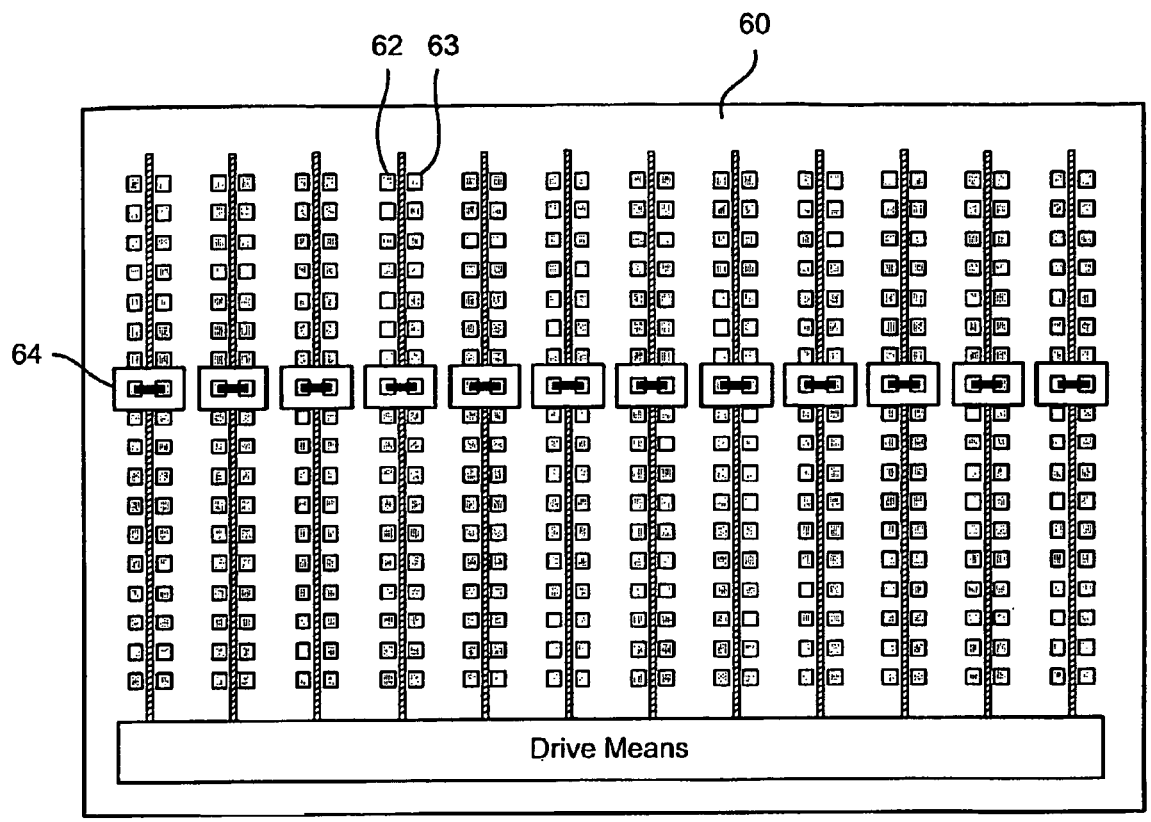
FIG. 14 shows a top view of a portion of the cross-connection board.

FIG. 14 shows a top view of a portion of the cross-connect board 60. The board 60 is configured as a switching matrix for cross-connecting a number of input line pairs to a number of output line pairs. The board comprises a plurality of electrically conducting contact points (62,63) formed into a PCB in which an electrical connection between them is made when a contact sledge 64 is mechanically slid over to make contact with the two contact points. The site controller 332 supplies suitable operating current to the selected cross-connect board in order to operate the cross-connects during a command transmission session. There is no additional power requirement for maintaining the cross-connects i.e. the cross-connects are inherently quiescent or consumes no power when in a static state.

Figure 15:
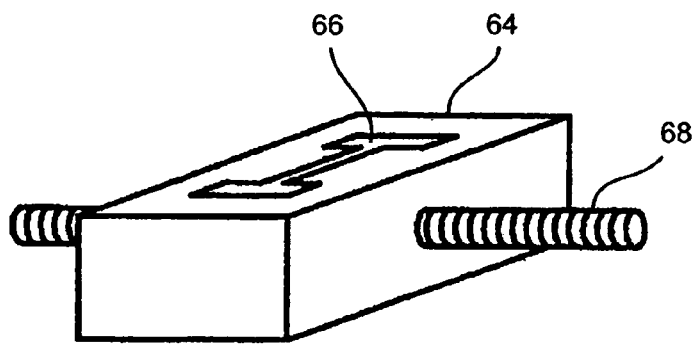
FIG. 15 shows a perspective view of the sliding contact sledge used in the cross-connection board.

FIG. 15 shows a perspective view of the sliding contact sledge 64 used in the cross-connection board of the invention. The contact sledge is elongated and has contact springs 66 for making contact between two pairs of contact points. An additional pair of contact springs can be included on the contact sledge for detecting its position on the matrix. The contact sledge body contains a threaded hole into which moving means such as a positioning screw 68 turns to drive the contact sledge to make contact with the appropriate contacts in the switch matrix board. The screw 68 is connected to and driven by a motor e.g. a stepper motor such that reversing its direction moves the sledge in the other direction. A plurality of motor drivable contact sledges are included in the switch matrix of the cross-connect boards to enable automation of cross-connection of the line pairs serviced by the board. The mechanical nature of the switching action of the matrix board provides high operating reliability under a wide range of temperatures.

Figure 16:
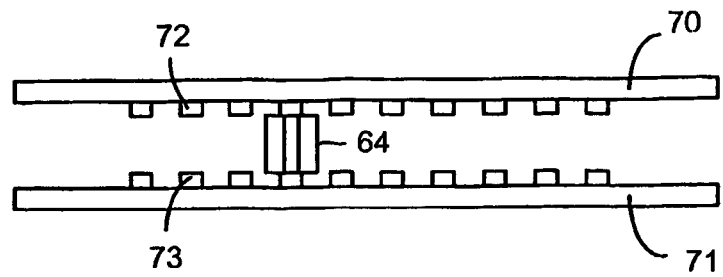
FIG. 16 shows an alternative board configuration where the contact points are placed on two opposing PCBs connected by the contact sledge.

FIG. 16 shows an alternative board configuration where the contact points are placed on two opposing PCBs such that contact points 72 are on one PCB 70 and contact points 73 are on the another PCB 71. The contact sledge 64, having suitable contact springs, slides between the contact points of the opposing PCBs. In one variation, the contact sledge has two of contact springs on one side for cross-connecting a pair of lines and another contact spring on the other side for positioning purposes by detecting positioning contacts. It should be noted that the board is not limited to the arrangement of the contact points in rows to form a switch matrix for line pairs, but that the contact points can be connected in ways that achieve many other combinations of interconnections.

In the central office application, the site controller 332 can be linked via a TCP/IP Ethernet based communication link or LAN 336 to direct a number of automated MDFs under this site. The site controller keeps track of the cross-connects of line pairs on all cross-connect boards. Another important function is that it retains routing information necessary to direct the making of a new cross-connect for a specific line pair when instructed to do so by the service provider.

Figure 17:
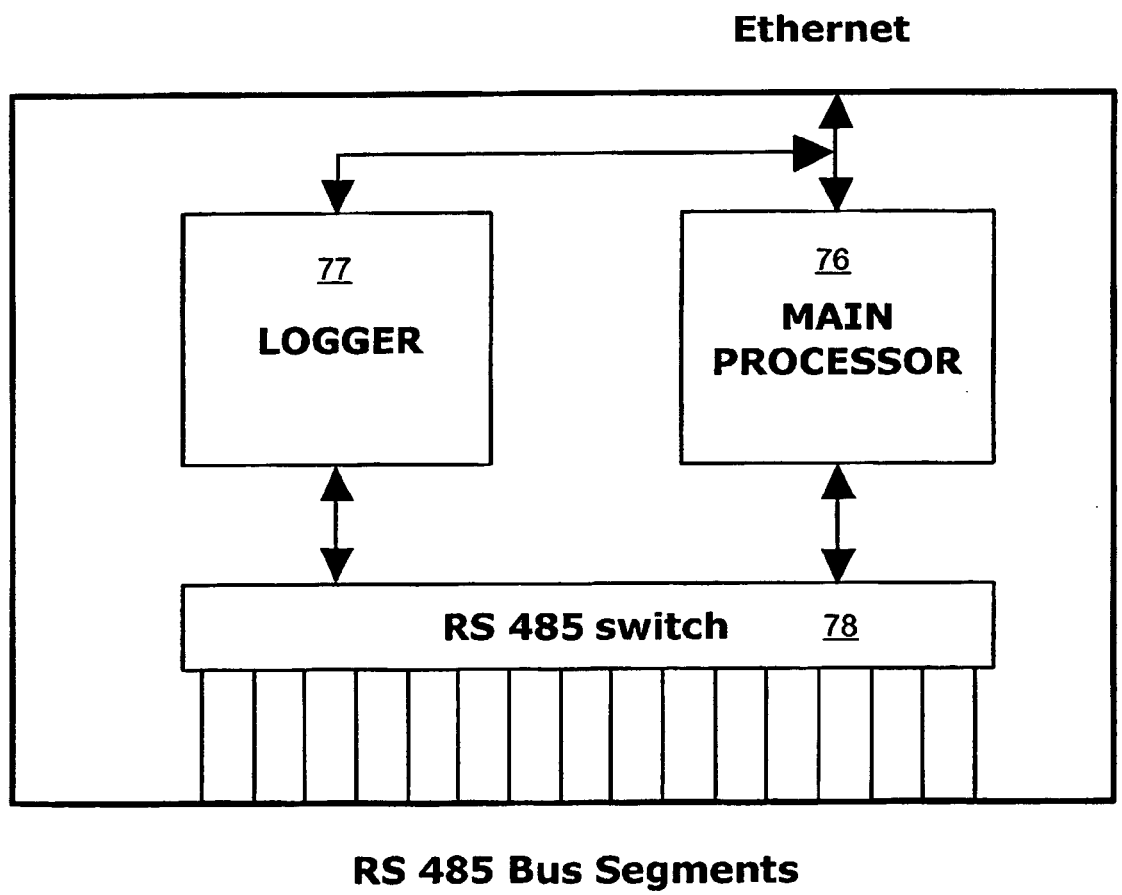
FIG. 17 shows a schematic diagram of the site controller.

FIG. 17 shows a schematic diagram of the site controller 332. The site controller is connected to the Ethernet LAN 336 for connection to the central office computer 350 and to remote computer 352. A main processor 76 processes a request for establishing or modifying a specific cross-connect and determines the best route or sequence of events to carry it out. An updated database containing the current status of the cross-connects is of vital importance for restoring connections in the event of a system or power failure, for example. In the rare event where a software glitch causes the main processor 76 to inappropriately alter cross-connections, a logger 77 can be included for redundant tracking of the main processor and to disconnect the RS485 switch from the cross-connect boards. This function can also be implemented into software thereby eliminating the need for the logger, however, many operators may prefer having a hardware-based solution for preventing such a potentially serious situation that would affect subscriber service. The information on the state of each cross-connect is stored in a database that may be kept redundantly at other site controllers or at a higher system level computer.

There exists an unusual possibility that a specific cross-connect may be 'blocked' due to existing connections on the matrix and through the stage levels. The processor is able to determine an oncoming blocking situation and devise an alternative route for reaching the necessary cross-connect while maintaining the existing line connections. This may require that some connections on the board be temporarily moved to the redundant cross-connects 380 (FIG. 12) in order to 'unblock' or clear the path to the originally selected cross-connect. A number of control lines emanate from the interface 78 that extends to the MDF to provide control and signal data for selecting the cross-connect board and supplying power to operate the cross-connects. Each cross-connect board and cross-connect is individually addressable by the site controller 332 whereby an identity response from the board is returned on the RS485 bus to the site controller. The RS485 switch comprises bus segments enable a plurality of cross-connect boards to be driven at some distance e.g. typically on the order of 100 boards per segment.

On a system level, a work order for installation of new line connection, for example, can be entered from a remote computer 352 located at the operator's command center or other computers connected to the Ethernet based LAN/WAN network 344 in affiliated shops selling services directly to customers. The remote computers 352 on the LAN/WAN 344 are connected to the Internet 340 through a system gateway 354, such that they can be located a great distance from the MDFs. This allows the operator with the capability to remotely control the installation, removal, or modification of telecommunication services to subscribers quickly and efficiently from a remote location. The system gateway 354 provides access to the automated cross-connect system in that it checks whether the automated system has been installed in the central office servicing the subscriber line. For MDFs that are found not have the system installed, the query is bounced back to the remote computer 352 with the indication that the cross-connection cannot be made remotely. In that case, the work order enters the traditional order processing chain where technicians are eventually dispatched to the MDF from the central office for manual jumper wire installation.

A network management computer terminal 350 can be located at the central office site to provide detailed monitoring and maintenance oversight of the various site controllers under its supervision. The computer terminal 350 can be linked to a LAN/WAN 348 for connection to site controllers via the Internet 340. In the event of a problem reported by the site controller with e.g. any of the cross-connect boards, a corresponding alarm is raised at the central office at which time a technician is dispatched to fix the problem. An Ethernet based LAN/WAN 336 typically links the site controllers to the central office. The central office computer terminal can also be used to display a detailed view of a single installation or the entire site. The terminal can also be used to show maintenance procedures such as line verification and testing, provide alarm handling for the site controller and MDF, and cross-connect board malfunctions.

The site controller has access to the current cross-connect status of all lines is known from a stored database. This enables close monitoring and control of all cross-connects within the system. Reliability is enhanced since the system is able to test an individual line pair to verify a proper connection before activating the cross-connect. The automated system eliminates the costly and error prone manual process of documenting new, removed, or modified line connections.

Extended Automated Cross-Connect Network

The copper network may include what are known as street cabinets and drop point sites deployed at a lower level from the MDF. These sites generally include cross-connects similar to those in the MDF in addition to some data processing capabilities and special circuits. Street cabinets and drop point sites are often deployed in the field to service typically residential and small business users. These deployment sites are generally located in a small geographical area having a much denser population. The cabinets or drop point sites are closely spaced together or may be located inside of urban buildings. A moderate to high level of service order activity is encountered in connection with the urban cross-connect cabinet or drop point site. Also, in the urban setting, cross-connect sites may be much more difficult to reach and service.

Cross-connect cabinets may be used in a commercial or industrial setting where they are deployed onsite to service medium to large business. These cabinets are located in a small to moderate geographical area, and they typically serve large outside terminal boxes, or boxes inside of buildings. The cabinets extend from the terminal boxes to the subscriber's locations in conventional fashion in order to complete each separate telecommunications pair path. A high level of change activity is encountered whereby numerous requests for line connections and disconnections, as well as modifications for provisioned services, for each facility serviced. Predicting such requirements is particularly difficult for the operating telephone company, as businesses move into, and expand and reduce operations within business sites. While access to cross-connect cabinets in business sites is readily available, due to the high service order change activity, substantial labour expenses are incurred for traditional manual modification of cross-connections to fulfil service orders. It becomes clear that automating these sites would be tremendously cost effective.

Figure 18:
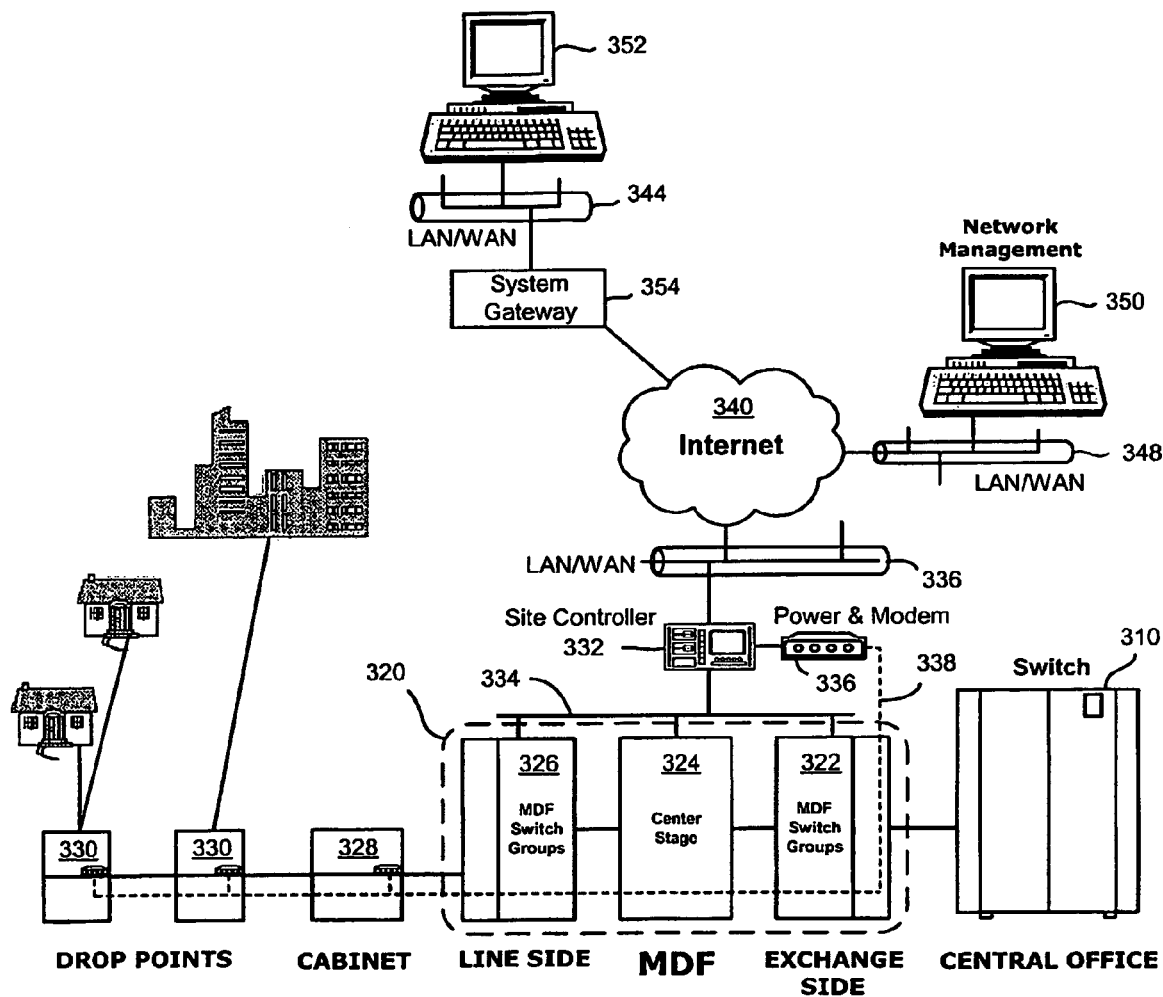
FIG. 18 illustrates a remotely controlled automated cross-connect system operating in accordance with a second embodiment of the invention.

FIG. 18 shows an automated cross-connect system in accordance with a second embodiment of the invention whereby, in addition to the MDF, non-central office cross-connect cabinets and drop point sites are also automated and controlled from a remote location. Although only one cross-connect cabinet 328 and two drop point sites 330 are shown in FIG. 18, it is to be understood that they are representative of a plurality of such cabinets 328 or drop points 330 are deployed throughout the network as remote switch groups that are capable of being supervised by a single site controller 332 within the central office. The site controller 332 includes a modem 360 communicating over a RS485 link 362, which is routed through the MDF to interconnect the site controller 332 to the automated cabinets 328 and drop point sites 330. The modem uses a point-to-point (PPP) protocol with the addition that the signal is overlaid on the voltage that is used to power the remote installation. It should be understood that the invention is in no way limited to using an RS485 link but other links such as a wireless links are possible.

The site controller receives cross-connect switching information from the remote command center, such as remote computer 352 at the central command location via the Internet/Ethernet using TCP/IP protocols. This enables control from a remote computer located virtually anywhere in the world to access the system using secure Internet transmission protocols. The site controller converts the switching information received from the remote computers 350 and 352 into appropriate command sequences that are sent via link 338 to e.g. conventional dialup modems located within the specified cross-connect cabinet or drop point. All cross-connect boards, and thus individual cross-connects, in the remote switch groups operated under the site controller are selectable. During a cross-connect switching operation, only the cross-connect board having the cross-connect sought is supplied with power. This selective powering of a single board reduces the likelihood of cross-connects being activated other than the one intended during the command sequence.

The remote computer 350 can be a stand-alone computer, terminal or laptop that enables the operator to control and monitor the entire network using a standard Web browser. The management system code runs in the site controller and communicates with the remote computer 350 via standard TCP/IP protocols. An example of the procedure for using the system is described. By way of example, when a work order is received to turn up service for a new subscriber, the software via the site controller looks for the best available path according to the availability of cross connections of the nearest remote switch group. The computer operator has the capability to manually override any automatic line pair assignment suggested by the software, and may remove a particular line pair from service in the event that it is determined to be of marginal quality or is defective, or is already in use elsewhere. In order to assist in determining an alternative path, the operator is able to view a graphical diagram of which cross-connects and lines are in use and the remaining free capacity of the MDF, cabinet or drop point site. The NMS also allows the operator to perform maintenance, and diagnostic routines, line testing and verification of the MDF and remote switch groups quickly and easily directly from the remote computer 350. A technician only needs to be dispatched to the site for repairs when a serious problem is diagnosed. It is also possible for technicians to perform maintenance, testing and diagnostic routines on the MDF and remote switch groups from the central office by connecting a laptop computer to local RS485 port at the site controller 332.

The current status of the cross-connects is automatically updated to reflect any changes to the cross-connects in the system in real-time. The information is displayed to the operator from the database maintained by the site controller. The data is backed up, at the main command center, central office, or other site controllers on non-volatile memory such as a hard disk or EEPROM (programmable read only memory) to facilitate data recovery in the event of a local or system wide power failure or interruption.

Figure 19:
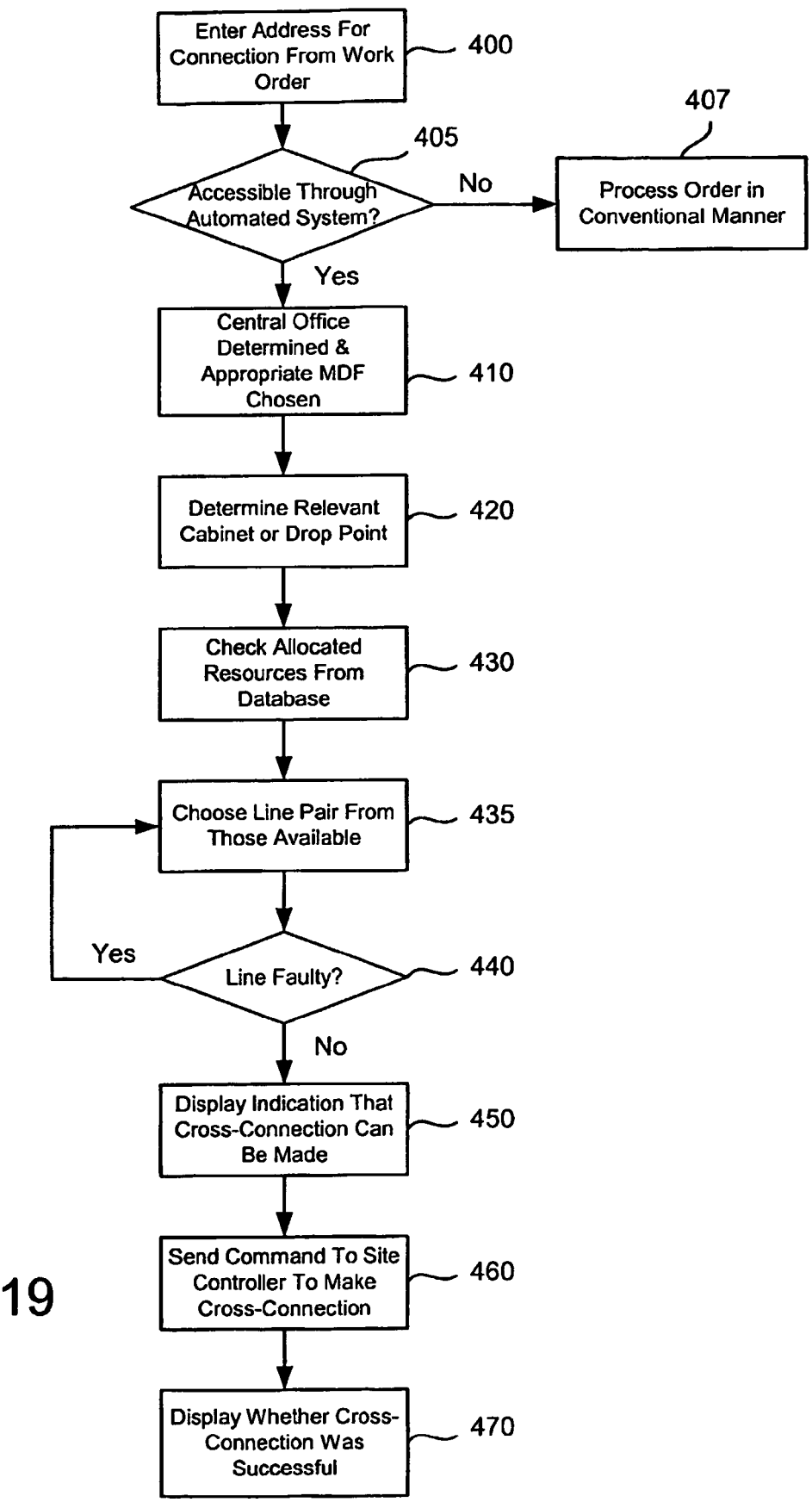
FIG. 19 is a flow diagram of an exemplary process for making a cross-connection from a remote computer terminal.

FIG. 19 is a flow diagram illustrating the process of one way of entering an order for connecting a new subscriber telephone line from an affiliated retail store or service center, for example. Those skilled in the art will appreciate that the various steps may occur in a different order, be eliminated entirely, or include additional steps from the exemplary procedure shown. An example of a typical connection procedure follows. The store is linked to LAN/WAN 344 which allows it to directly access the service provider's telecom network. The merchant enters information into the computer 352, such as the city and address of where the desired line is to be connected, as shown in step 400. In step 405, the entered information is sent to the system gateway 354, which determines whether the address is accessible through the automated system i.e. it checks to see if the automated equipment was installed in the MDF servicing the address. If not, then the work order is processed in the conventional manner in which the central office sends a technician to the MDF site for manual cross-connection using jumper wires, as shown in step 407. From on the address information, the software determines the correct central office and the most suitable MDF based on proximity and available lines, as shown in step 410. If the line is to be installed in a business park or residential area, the most relevant cross-connect cabinet or drop point site is determined in step 420. Once the cabinet or drop point box has been selected, in step 430 the software checks the allocated resources by retrieving the current utilization status of the lines from the database and selects an available line in step 435. The site controller typically keeps the database information, however, the information may be kept at the system level at the remote command center, for example.

In step 440, a line pair is chosen from a list of available lines and is subjected to pre-verification test to determine if the line is faulty. If the line passes the verification test it is displayed to the operator with the indication that the cross-connection is ready to be made upon selection in step 450. If the operator elects to establish the cross-connect, the remote computer sends commands to the central office site controller in step 460, which identifies and locates the correct cross-connect board and cross-connect and makes the connection. Within minutes the operator receives a response that the cross-connection was successfully made or that an error condition occurred, as shown in step 470.

The foregoing description of the preferred embodiments of the invention has been presented for purposes of illustration and description. It is not intended to be exhaustive or to limit the invention to the precise forms disclosed, since many modifications or variations thereof are possible in light of the above teaching. Accordingly, it is to be understood that such modifications and variations are believed to fall within the scope of the invention. The embodiments chosen were described in order best to explain the principles of the invention and its practical application, thereby enabling those skilled in the art to utilize the invention for the particular use contemplated. Still, it should be noted that the inventive concept can be applied to any application that would benefit from automated cross-connections such as patch panels used in connecting data communications equipment such as a LANs to the other networks or electronic systems. For example, a patch panel is typically used to connect the network's computers to each other and to outside lines such as the Internet or another WAN. The connections to and from the patch panel are made with patch cords or other cross-connect components, and changes to any of the voice or data lines require a technician to physically install, remove, or modify the patch cords. This turns out to be one of the most time-consuming and cost-intensive processes in the overall support of a communications system and would greatly benefit from the automated cross-connecting system described herein. It is therefore the intention that the following claims not be given a restrictive interpretation but should be viewed to encompass variations and modifications that are derived from the inventive subject matter disclosed.

The invention claimed is:

1. An automated cross-connect system suitable for use in a telecommunication network central office comprising a network of communication lines for connecting subscriber locations to a central office exchange, said communication lines extend to the subscriber locations from a main distribution frame (MDF) that comprises a plurality of connector blocks housed therein for terminating the communication lines from to the subscriber locations and the lines from the exchange, such that the automated cross-connect system being capable of activating cross-connects between the subscriber communication lines and the exchange, wherein the modular cross-connect boards, each including a switch matrix comprising a plurality of cross-connect elements, and wherein said modular cross-connect boards are coupled to the connector blocks in a scalable manner such that the MDF is automated by selectively controlling the connection state of the plurality of cross-connects remotely via the central office, wherein the system is scalable to a growth in subscriber lines within the MDF by installing additional cross-connection boards as necessary to meet the need, wherein the switch matrix is comprised of sliding engagable contact sledges that are moved into position by an electric motor, the switch matrix comprises a plurality of electrically conductive contacts disposed on multiple PCBs by which any input line can connectable to any output line is achieved by the moving the sledges along different paths and transport planes, wherein the contact sledges comprise contact springs for making contact between two pairs of contact points, and another contact spring for detecting the position of the contact sledges on the matrix.

2. An automated cross-connect system according to claim 1 wherein a remote computer terminal communicates with a site controller that supervises the MDF to identify the appropriate modular cross-connect board and the appropriate cross-connect for changing its connection state.

3. An automated cross-connect system according to claim 2 wherein the site controller is linked to the cross-connect boards via a communication link that also provides power for automating the cross-connects.

4. An automated cross-connect system according to claim 2 wherein the remote computer terminal communicates with the site controller via the Internet, Ethernet, or LAN using TCP/IP based protocol, said remote computer terminal running network management application software (NMS) capable of selectively actuating all cross-connects within the system, verifying line connections, and running trouble shooting diagnostics.

5. An automated cross-connect system according to claim 4 wherein the NMS automatically checks, verifies, and establishes line connections in accordance with standard operator procedures.

6. An automated cross-connect system according to claim 1 wherein the switch matrix further includes:

a bypass cross-connect for each line for bypassing the switch matrix if, upon installation of the cross-connect board, there is a pre-existing cross-connect made e.g. by jumper wire for the line, and a reset position for each line for preserving an open line condition that is used when there is no jumper wire installed for the line upon installation of the cross-connect board or when the line is disconnected or removed.

7. An automated cross-connect system according to claim 1 wherein the cross-connect boards are mounted in a center stage interconnecting the line side and exchange side communication lines within the MDF cabinet.

8. An automated cross-connect system according to claim 1 wherein the cross-connect boards are installed in MDFs with pre-existing cross-connections established by jumper wires without disrupting the existing connections.

9. An automated cross-connect system according to claim 1, wherein the plurality of cross-connect boards are further located in street cabinets and drop point sites that are in communication with the site controller in a manner such that the plurality of cross-connects are selectively controlled by the remote computer terminal.

10. An automated cross-connect system according to claim 9 wherein the site controller communicates with the street cabinets and drop point sites via modems coupled to a communication link, and wherein power for actuating the cross-connects is supplied over the link.

11. A method of automating cross-connects using a scalable automated cross-connect system in a telecommunication network central office comprising a network of communication lines for connecting subscriber locations to the central office exchange, said communication lines extend to the subscriber locations from a main distribution frame (MDF) that comprises a plurality of connector blocks housed therein for terminating the communication lines from to the subscriber locations and the lines from the exchange, such that the automated cross-connect system being capable of selectively establishing cross-connects between the subscriber communication lines and the exchange, the method is comprising the steps of:

entering into a remote terminal information related to making a desired connection for establishing or removing a subscriber communication line;

determining the appropriate MDF in the telecommunication network central office;

checking the current allocated resources relating to the MDF from a database;

selecting an available communication line for connection to the exchange;

transmitting commands to the selected MDF comprising a plurality of modular cross-connect boards coupled to the connector blocks in a scalable manner, wherein each including a switch matrix comprising a plurality of cross-connects;

identifying and selecting the appropriate modular cross-connect board and cross-connect to activate; and remotely controlling the connection state of the selected cross-connect on the selected modular cross-connect board via the central office, wherein a specific cross-connect board and cross-connect thereon is identified and selected to automatically activate, remove, or modify the subscriber line, by moving slidably engagable contact sledges comprised in a switch matrix of said cross-connect board into position by an electric motor whereby, by moving the sledges along different paths and transport planes, any input line is connectable to any output line;

making contact between two pairs of contact point by contact springs comprised in the contact sledges; and detecting the position of the contact sledges on the matrix by means of another contact means comprised in the contact sledges;

wherein the system is scalable to a growth in subscriber lines within the MDF by coupling further modular cross-connection boards to available connector blocks.

12. A method according to claim 11 wherein in the determining step the information is sent to a system gateway which determines whether the subscriber communication line is accessible through the automated telecommunication system.

13. A method according to claim 11 wherein the remote terminal is a computer running network management application software (NMS) transmits commands to a site controller that supervises the MDF to identify the appropriate modular cross connect board and the appropriate cross-connect for changing its connection state.

14. A method according to claim 13 wherein the site controller transmits commands to and provides power to the modular cross-connect boards via a communication link.

15. A method according to claim 13 wherein the modular cross-connect boards are installed in street cabinets and drop point sites are automated for control by the remote computer terminal via the site controller, in which signals are transmitted and received via modems coupled to communication link.

16. A method according to claim 13 wherein when the route to the selected cross connect is "blocked" due to existing connections on the cross-connect board and stage levels such that the site controller determines an alternative route for reaching the cross-connect while maintaining the existing line connections.

17. A method according to claim 11 wherein the switch matrix comprise a plurality of slidably engagable contact sledges for engaging pairs of electrically conductive contact pads for establishing cross-connects, wherein the contact sledges are moved into position by electric motors.

18. A method according to claim 11 wherein the remote terminal communicates with the site controller via the Internet, Ethernet, or LAN using TCP/IP based protocol.

19. A method according to claim 11 wherein the NMS automatically tests, verifies, and documents current line connections in accordance with standard operator procedures.

20. A method according to claim 11 wherein the installation of the modular cross-connect boards into the connector blocks is non-intrusive and does not disrupt the existing connections.

21. A method according to claim 11 wherein in the transmitting step, a database is updated in accordance with the command for the associated the cross-connect.

* * * * *

UNITED STATES PATENT AND TRADEMARK OFFICE
CERTIFICATE OF CORRECTION

PATENT NO. : 8,385,535 B2
APPLICATION NO. : 10/596385
DATED : February 26, 2013
INVENTOR(S) : Roos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1962 days.

Signed and Sealed this

First Day of September, 2015

Michelle K. Lee
*Director of the United States Patent and Trademark Office*